(12) United States Patent
Guan

(10) Patent No.: US 11,538,243 B2
(45) Date of Patent: Dec. 27, 2022

(54) VIDEO PLAYBACK METHOD, MEDIUM, GLASSES AND PROGRAM PRODUCT

(71) Applicant: Beijing SuperHexa Century Technology CO. Ltd., Beijing (CN)

(72) Inventor: Jingyan Guan, Beijing (CN)

(73) Assignee: BEIJING SUPERHEXA CENTURY TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/523,765

(22) Filed: Nov. 10, 2021

(65) Prior Publication Data
US 2022/0277161 A1 Sep. 1, 2022

(30) Foreign Application Priority Data
Feb. 26, 2021 (CN) .......................... 202110215880.4

(51) Int. Cl.
*G06V 20/40* (2022.01)
*G06T 7/70* (2017.01)
*G06F 3/01* (2006.01)

(52) U.S. Cl.
CPC .............. *G06V 20/42* (2022.01); *G06F 3/011* (2013.01); *G06T 7/70* (2017.01); *G06T 2207/30224* (2013.01)

(58) Field of Classification Search
CPC ........... G06V 20/42; G06F 3/011; G06T 7/70; G06T 2207/30224; G02B 27/017
See application file for complete search history.

(56) References Cited

U.S. PATENT DOCUMENTS

| | | | |
|---|---|---|---|
| 2012/0029354 A1 | 2/2012 | Mark et al. | |
| 2016/0029321 A1 | 1/2016 | Hwang et al. | |
| 2018/0247676 A1* | 8/2018 | Raphael | H04N 21/4394 |
| 2020/0376395 A1 | 12/2020 | Ryan | |

FOREIGN PATENT DOCUMENTS

| | | |
|---|---|---|
| CN | 101543047 A | 9/2009 |
| CN | 104702919 A | 6/2015 |
| CN | 104735385 A | 6/2015 |
| CN | 111263170 A | 6/2020 |
| CN | 111897425 A | 11/2020 |
| CN | 112335258 A | 2/2021 |

OTHER PUBLICATIONS

Search Report of the parallel EP application No. 21208391.9.
First Office Action of the priority application CN202110215880.4.

* cited by examiner

*Primary Examiner* — Rodney Amadiz
(74) *Attorney, Agent, or Firm* — J.C. Patents

(57) ABSTRACT

The present application provides a video playback method, a medium, glasses and program product. The video playback method provided by an embodiment of the present application acquires a scene video of an external scene in real time by the smart glasses that are worn, then extracts a target video of a target time period corresponding to key point information from the scene video, and automatically plays back the acquired target video on the smart glasses, so that highlights are automatically played back to a spectator in time during in-person watching, thereby improving the spectator's watching experience greatly.

14 Claims, 7 Drawing Sheets

VIDEO PLAYBACK METHOD, MEDIUM, GLASSES AND PROGRAM PRODUCT

CROSS-REFERENCE TO RELATED APPLICATIONS

This application claims priority to Chinese Patent Application No. 202110215880.4, filed on Feb. 26, 2021, which is hereby incorporated by reference in its entirety.

TECHNICAL FIELD

The present application relates to the field of intelligent devices, more particularly to, a video playback method, a medium, glasses and a program product.

BACKGROUND

With the development of competitive sports, more and more sports lovers will choose to go to venues to watch games when various sports events (such as the Olympic Games, Winter Olympics, basketball league, etc.) are held.

At present, when watching a game in person, a spectator can only watch the performance of an athlete in real time, and playback of highlights can only be acquired through a large screen on site or competition highlights after the game.

It can be seen that through a traditional way of watching the game in person, the spectator cannot acquire the playback of highlights in time, which is easy to cause missing of the highlights of the game and affect the spectator's watching experience.

SUMMARY

An embodiment of the present application provides a video playback method, a media, glasses and a program product to solve a technical problem that a spectator cannot acquire playback of highlights in time and is easy to miss the highlights of the game during in-person watching.

In a first aspect, an embodiment of the present application provides a video playback method applied to smart glasses, and the method includes:

acquiring a scene video of an external scene;

extracting a target video from the scene video when key point information exists in the scene video, where the target video is a video of a target time period corresponding to the key point information; and playing back the target video on a lens of the smart glasses.

In a possible design, after the acquiring a scene video of an external scene, the method further includes:

determining the key point information according to characteristic information in the scene video, where the characteristic information includes at least one of an image characteristic or a sound characteristic, and the characteristic information is information corresponding to a target behavior in a current sports event.

In a possible design, the determining the key point information according to characteristic information in the scene video, including:

determining scoring point information according to a relative positional relationship between a preset ball target and a preset equipment target in the scene video, where the key point information includes the scoring point information; or determining starting or arriving point information according to a relative positional relationship between a preset character target and preset start line and end line targets in the scene video, where the key point information includes the starting or arriving point information; or determining a starting point corresponding to a sound characteristic as the key point information when the sound characteristic in the scene video meets a preset sound condition.

In a possible design, before the playing back the target video on a lens of the smart glasses, the method further includes:

displaying prompt information on a lens of the smart glasses, where the prompt information is used to prompt that the key point information exists in the scene video; and acquiring a play confirmation instruction, where the play confirmation instruction is used to trigger a start of the playing back of the target video.

In a possible design, the video playback method further includes:

receiving a playback instruction sent by another device, where the playback instruction is used to prompt to play back the target video, or receiving a playback instruction and another video sent by another device, where the target video is different from the another video at least in a shooting angle of the external scene, and the playback instruction is used to prompt to play back the another video.

In a possible design, the playing back the target video on a lens of the smart glasses, includes:

determining a key point type corresponding to the key point information according to characteristic information in the scene video;

determining a playback speed of the target video according to the key point type and a preset playing rule; and playing back the target video on the lens of the smart glasses according to the playback speed.

In a possible design, after the playing back the target video on a lens of the smart glasses, the method further includes:

acquiring a trigger instruction acting on the smart glasses; and controlling a play progress of the target video according to the trigger instruction.

In a second aspect, an embodiment of the present application provides a video playback device, including:

an acquiring module, configured to acquire a scene video of an external scene;

a processing module, configured to extract a target video from the scene video when key point information exists in the scene video, where the target video is a video of a target time period corresponding to the key point information; and a displaying module, configured to play back the target video.

In a possible design, the processing module is further configured to determine the key point information according to characteristic information in the scene video, where the characteristic information includes at least one of an image characteristic or a sound characteristic, and the characteristic information is information corresponding to a target behavior in a current sports event.

In a possible design, the processing module is specifically configured to:

determine scoring point information according to a relative positional relationship between a preset ball target and a preset equipment target in the scene video, where the key point information includes the scoring point information; or determine starting or arriving point information according to a relative positional relationship between a preset character target and preset start line and end line targets in the scene video, where the key point information includes the starting or arriving point information; or determine a starting point corresponding to a sound characteristic as the key point information when the sound characteristic in the scene video meets a preset sound condition.

In a possible design, the displaying module is further configured to display prompt information on a lens of the smart glasses, where the prompt information is used to prompt that the key point information exists in the scene video; and the acquiring module is further configured to acquire a play confirmation instruction, where the play confirmation instruction is used to trigger a start of the playing back of the target video.

In a possible design, the video playback device further includes:

a receiving module, configured to receive a playback instruction sent by another device, where the playback instruction is used to prompt to play back the target video; or configured to receive a playback instruction and another video sent by another device, where the target video is different from the another video at least in a shooting angle of the external scene, and the playback instruction is used to prompt to play back the another video.

In a possible design, the displaying module is specifically configured to:

determine a key point type corresponding to the key point information according to characteristic information in the scene video;

determine a playback speed of the target video according to the key point type and a preset playing rule; and play back the target video on a lens of the smart glasses according to the playback speed.

In a possible design, the acquiring module is further configured to acquire a trigger instruction acting on the smart glasses; and the processing module is further configured to control a play progress of the target video according to the trigger instruction.

In a third aspect, an embodiment of the present application further provides smart glasses, including: a processor, a memory, a lens and an image sensor, and the processor is respectively connected with the memory, the lens, and the image sensor;

the image sensor is configured to acquire a scene video of an external scene;

the memory is configured to store a computer program of the processor;

where the processor is configured to implement any video playback method in the first aspect by executing the computer program; and the lens is configured to display the target video.

In a fourth aspect, an embodiment of the present application further provides a storage medium on which a computer program is stored, and any video playback method in the first aspect is implemented when the program is executed by a processor.

In a fifth aspect, an embodiment of the present application further provides a computer program product, including a computer program, the computer program implements any video playback method in the first aspect when the computer program is executed by a processor.

The embodiments of the present application provide a video playback method, a medium, glasses and a program product, which acquire the scene video of the external scene in real time by the smart glasses that are worn, then extract the target video of the target time period corresponding to the key point information from the scene video, and automatically play back the acquired target video on the smart glasses, so that highlights are automatically played back to the spectator in time when the spectator watches the game in person, thereby greatly improving the spectator's watching experience.

BRIEF DESCRIPTION OF DRAWINGS

In order to explain the embodiments of the present application or the technical solutions in the prior art more clearly, the following will briefly introduce the drawings required to be used in description of the embodiments or the prior art. It is obvious that the drawings in the following description are some embodiments of the present application. For those skilled in the art, other drawings may also be obtained from these drawings without creative effort.

DESCRIPTION OF EMBODIMENTS

Figure 1:
FIG. 1 shows an application scenario diagram of a video playback method according to an illustrative embodiment.

In order to make the purpose, technical solutions, and advantages of the embodiments of the present application clearer, the technical solutions in the embodiments of the present application will be clearly and completely described below in combination with the accompanying drawings in the embodiment of the present application. Obviously, the described embodiments are part of the embodiments of the present application, but not all of the embodiments. Based on the embodiments in the present application, all other embodiments obtained by those skilled in the art without creative effort belong to the protection scope of the present application.

The terms "first", "second", "third", "fourth" and the like (if any) in the description and claims of the present application and the above drawings are used to distinguish similar objects, and need not be used to describe a specific order or sequence. It should be understood that the data so used may be interchangeable where appropriate so that the embodiments of the present application described herein can be implemented in an order other than those illustrated or described herein. In addition, the terms "including" and "having" and any variations thereof are intended to cover non-exclusive inclusion. For example, a process, method, system, product or device including a series of steps or units needs not be limited to those steps or units clearly listed, but may include those that are not clearly listed or other steps or units inherent in the process, method, product or device.

At present, when a spectator watches a game in person, the spectator can only watch the performance of an athlete in real time, and the playback of highlights can only be acquired through a large screen on site or competition highlights after the game. It can be seen that through a traditional way of watching the game in person, the spectator cannot acquire the playback of highlights in time, which is easy to cause missing of the highlights of the game. For example, when a spectator watches a ball game in person, if the spectator doesn't see a current wonderful scoring clearly, he will directly miss the picture of the wonderful scoring. In addition, when a spectator watches a track and field competition (e.g. sprint) in person, because the duration of a sprint game is very short, and in this short time, the spectator is easy to miss many wonderful details, or when multiple participating athletes pass the finish line with small distances, it is difficult for the spectator to make a judgement on the wonderful final sprint picture before the finish line with his naked eyes.

The present application aims to provide a video playback method, which acquires a scene video of an external scene in real time by the smart glasses that are worn, then extracts a target video of a target time period corresponding to key point information from the scene video, and automatically plays back the acquired target video on the smart glasses, so that highlights are automatically played back to the spectator when the spectator watches the game in person, thereby greatly improving the spectator's watching experience.

FIG. 1 shows an application scenario diagram of a video playback method according to an illustrative embodiment. As shown in FIG. 1, the video playback method provided by the present embodiment may be used for a spectator watching a track and field competition (e.g. sprint) in a track and field venue. When watching the competition, the spectator may acquire a scene video of the track and field competition in real time by the smart glasses 100 that are worn, and then, a target video of a target time period corresponding to key point information is extracted from the scene video when it is determined that there is the key point information in the scene video through image analysis technology or audio analysis technology, and the target video is played back on a lens of the smart glasses.

For example, it may be determined that there is a starting signal in a currently recorded scene video (for example, a gunshot of a starting gun) by audio analysis technology, and then a target video with a preset time length is acquired with an occurrence time corresponding to the starting signal taken as a starting point, and the target video is taken as highlights of starting (for example, it may be a video of 2 seconds from the starting).

Or, it is also possible to determine a finish time by determining that an athlete crosses a finish line through image analysis technology, and then a target video with a preset time length is acquired with the finish time taken as a reference point, and the target video is taken as highlights of final sprint (for example, it may be a video of 2 seconds before and 1 second after the finish time).

In addition, it is also possible to determine an overtaking time in a currently recorded scene video through audio analysis technology (for example, a cheer of spectators), and then a target video with a present time length is acquired with the overtaking time taken as a reference point, and the target video is taken as highlights of overtaking (for example, it may be a video of 1 second before and 1 second after the overtaking time).

Finally, the respective determined target videos may be played back on a lens of the smart glasses after the game, so that the spectator can timely acquire the playback of highlights of the game.

Figure 2:
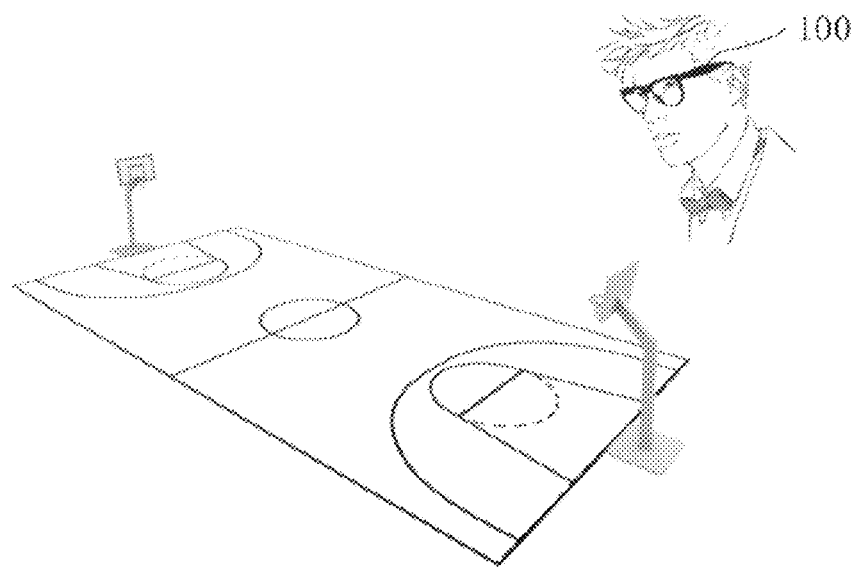
FIG. 2 shows an application scenario diagram of a video playback method according to another illustrative embodiment.

FIG. 2 is an application scenario diagram showing a video playback method according to another illustrative embodiment. As shown in FIG. 2, the video playback method provided by the present embodiment may also be used for a spectator watching a ball game (e.g., a basketball game) on the court. When watching the game, the spectator may acquire a scene video in the court in real time by the smart glasses 100 that are worn, and then, a target video of a target time period corresponding to key point information is extracted from the scene video when it is determined that there is the key point information in the scene video through image analysis technology or audio analysis technology, and the target video is played back on a lens of the smart glasses.

For example, it is also possible to determine a scoring time by determining that a basketball is shot into a basket through image analysis technology, and then a target video with a preset time length is acquired with the scoring time taken as a reference point, and the target video is taken as highlights of scoring (for example, it may be a video of 2 seconds before the scoring time and 1 second after the scoring time).

Or, it is also possible to determine a foul time by determining a referee's whistle through audio analysis technology, and determining the referee's foul gesture with image analysis technology, and then a target video with a preset time length around the foul time is acquired with the foul time taken as a reference point, and the target video is taken as highlights of foul (for example, it may be a video of 2 seconds before and 1 second after the foul time).

Finally, after scoring or fouling, a corresponding determined target video may be automatically played back on a lens of smart glasses, so that the spectator can timely acquire the playback of highlights of the game.

Figure 3:
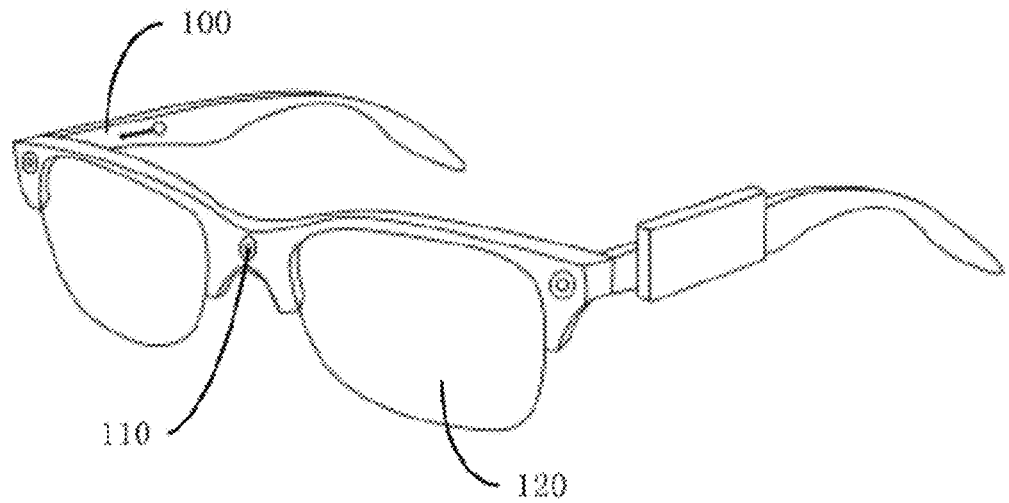
FIG. 3 shows a structural diagram of smart glasses according to an illustrative embodiment.

FIG. 3 shows a structural diagram of smart glasses according to an illustrative embodiment. As shown in FIG. 3, for the above scenarios, at least one image sensor 110 is arranged on the smart glasses 100 worn by the spectator, so that the scene video of the external scene is acquired through the image sensor 110. In addition, the smart glasses 100 are also provided with a lens 120 capable of displaying information, so that the target video that needs to be played back for the spectator can be played back on the lens 120.

Figure 4:
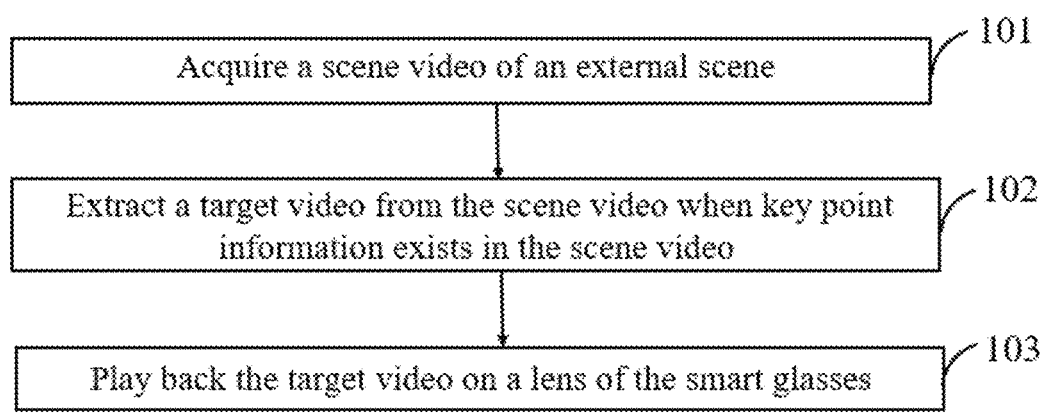
FIG. 4 shows a flowchart diagram of a video playback method according to an illustrative embodiment.

FIG. 4 shows a flowchart diagram of a video playback method according to an illustrative embodiment. As shown in FIG. 4, the video playback method provided by the embodiment includes:

Step 101: acquire a scene video of an external scene.

In this step, a spectator may wear smart glasses while watching a game, so that the scene video of the current external scene, for example, a scene video of a sprint game or a scene video of a basketball game, is acquired through an image sensor on the smart glasses.

Step 102: extract a target video from the scene video when key point information exists in the scene video.

After acquiring the scene video, the target video may be extracted from the scene video by determining the key point information in the scene video, where the target video is a video of a target time period corresponding to the key point information.

A determination model that can automatically identify the key point information may be established through deep learning by using various key point information and corresponding characteristic information of events as training materials. Thus, the model is used to automatically acquire the key point information from the acquired scene video.

Step 103: play back the target video on a lens of the smart glasses.

After the target video is extracted from the scene video, the target video can be played back on the lens of the smart glasses.

In the present embodiment, the scene video of the external scene is acquired in real time by the smart glasses that are worn, and then the target video of the target time period corresponding to the key point information is extracted from the scene video, and the acquired target video is automatically played back on the smart glasses, so that highlights are automatically played back to the spectator in time during in-person watching, thereby improving the spectator's watching experience greatly.

Figure 5:
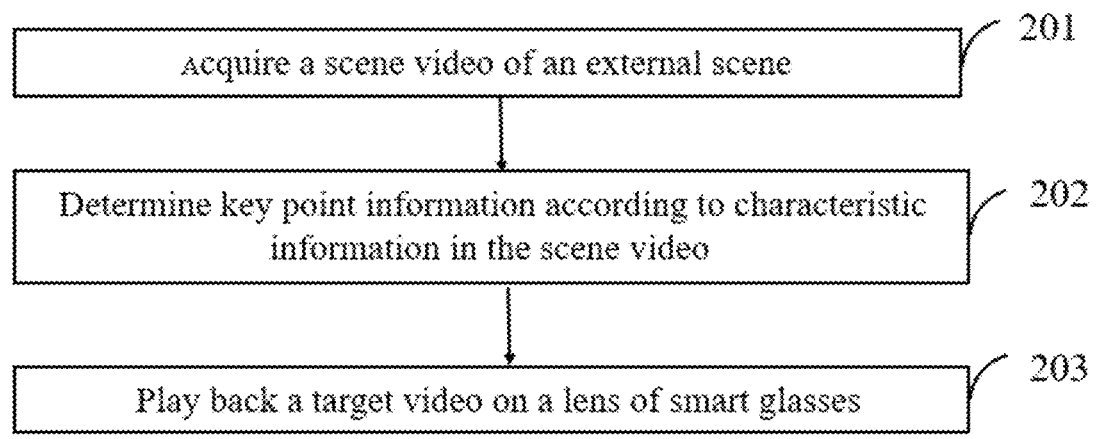
FIG. 5 shows a flowchart diagram of a video playback method according to another illustrative embodiment.

FIG. 5 shows a flowchart diagram of a video playback method according to another illustrative embodiment. As shown in FIG. 5, the video playback method provided by the present embodiment includes:

Step 201: acquire a scene video of an external scene.

In this step, the spectator can wear smart glasses while watching the game, so that the scene video of the current external scene, for example, a scene video of a sprint game or a scene video of a basketball game, is acquired through an image sensor on the smart glasses.

Step 202: determine key point information according to characteristic information in the scene video.

In this step, the key point information is determined according to the characteristic information in the scene video, where the characteristic information includes at least one of an image characteristic or a sound characteristic, and the characteristic information is information corresponding to a target behavior in a current sports event.

Specifically, scoring point information may be determined according to a relative positional relationship between a preset ball target and a preset equipment target in the scene video, and the key point information includes the scoring point information. For example, if the sport currently watched by the spectator is a basketball game, the image characteristic included in the characteristic information may be a characteristic of a positional relationship between a basketball and a basket, so as to determine a scoring time by determining that the basketball is shot into the basket through the image analysis technology, and take the scoring time as the key point information.

It is also possible to determine starting or arriving point information according to a relative positional relationship between a preset character target and preset start line and finish line targets in the scene video, and the key point information includes the starting or arriving point information. For example, if the sport currently watched by the spectator is a sprint game, the image characteristic included in the characteristic information may be a characteristic of a positional relationship between the athlete and the finish line, so as to determine the finish time by determining that the athlete crosses the finish line through the image analysis technology, and take the finish time as the key point information. In addition, the sound characteristic included in the characteristic information may be a sound of a starting gun, so as to determine that the sound of the starting gun exists in the currently recorded scene video through audio analysis technology, and an occurrence time corresponding to the starting signal is taken as the key point information.

Or, it is also possible to determine a starting point corresponding to a sound characteristic as the key point information when the sound characteristic in the scene video meets a preset sound condition. For example, if the sport currently watched by the spectator is a football game, the sound characteristic included in the characteristic information may be a cheer, and a wonderful moment is determined through audio analysis technology and taken as the key point information.

In addition, it is also possible to make a collaborative determination according to a sound characteristic and an image characteristic in the scene video. For example, if the sport currently watched by the spectator is a basketball game, the sound characteristic included in the characteristic information may include a referee's whistle and the referee's foul gesture, then the referee's whistle may be determined through audio analysis technology, and the referee's foul gesture may be determined with image analysis technology, so as to determine the foul time as the key point information.

Step 203: play back a target video on a lens of smart glasses.

The target video is extracted from the scene video, and then the target video can be played back on a lens of the smart glasses.

In addition, in order to further enrich playback forms of the highlights of events, it is also possible to determine a key point type corresponding to the key point information according to the characteristic information in the scene video, and then determine a playback speed of the target video according to the key point type and a preset playing rule, then the target video is played back on a lens of the smart glasses according to the playback speed. For example, when the key point type corresponding to the key point information is determined as the foul time according to the characteristic information in the scene video, the playback speed can be slowed down so that the spectator can clearly see a foul action.

In the present embodiment, the scene video of the external scene is acquired in real time by the smart glasses that are worn, and then the target video of the target time period corresponding to the key point information is extracted from the scene video according to at least one of the image characteristic or the sound characteristic in the scene video, and the acquired target video is automatically played back on the smart glasses so that the highlights are automatically played back to the spectator in time during in-person watching, and the spectator's watching experience is greatly improved.

Figure 6:
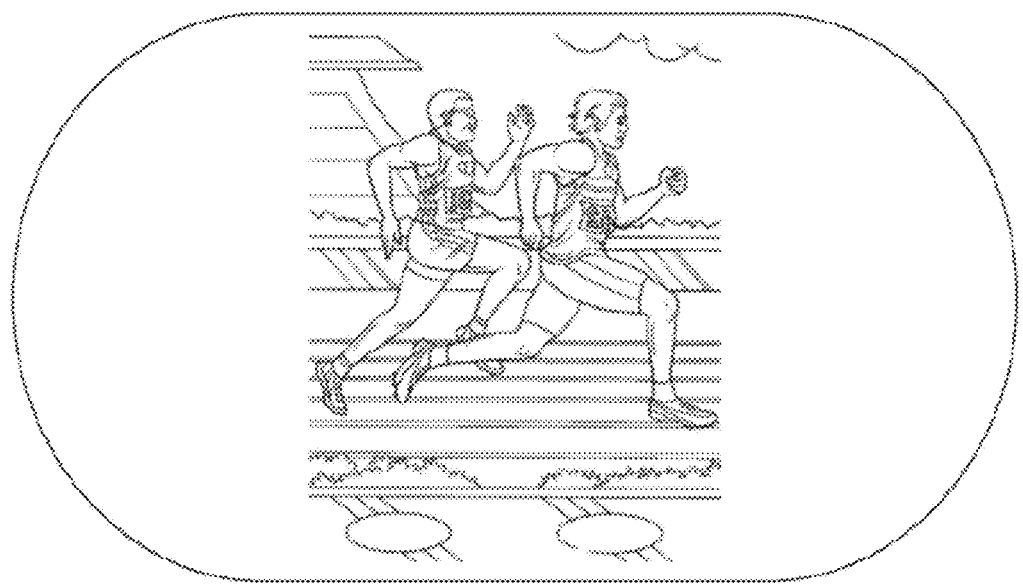
FIG. 6 shows a schematic diagram of video playback and display according to an illustrative embodiment.

FIG. 6 shows a schematic diagram of video playback and display according to an illustrative embodiment. As shown in FIG. 6, it is a view field that a spectator can see when watching a sprint game through smart glasses, where the target video acquired during the sprint game can be displayed on a lens of the smart glasses, that is, displayed in the view field of the current spectator.

Figure 7:
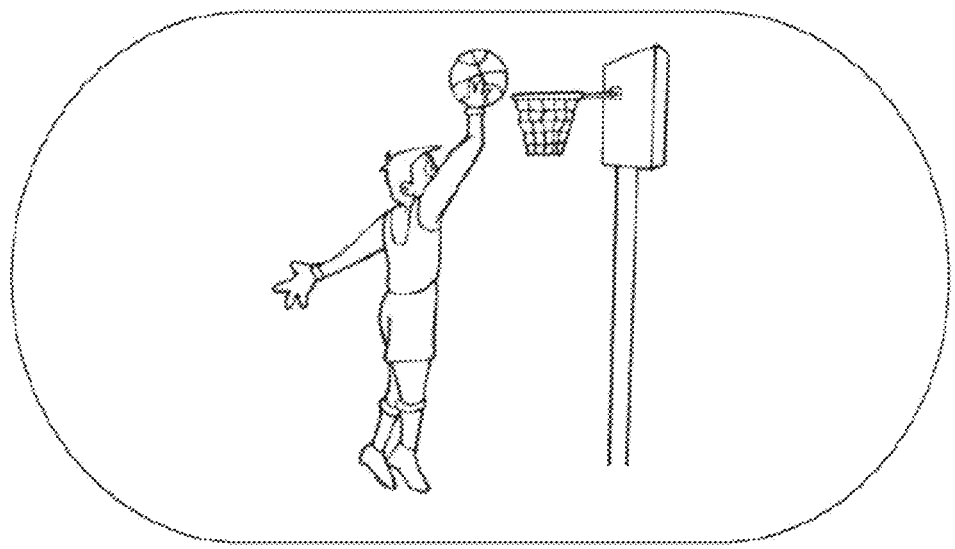
FIG. 7 shows a schematic diagram of video playback and display according to another illustrative embodiment.

FIG. 7 shows a schematic diagram of video playback and display according to another illustrative embodiment. As shown in FIG. 7, it is a view field that the spectator can see when watching a basketball game through smart glasses, where the target video acquired during the basketball game can be displayed on a lens of the smart glasses, that is, displayed in the view field of the current spectator.

In order to avoid an inconvenience caused by automatic playback to the user, affecting the spectator's watching experience in a watching process, that is, when the spectator needs to continue to watch a live screen, the video is played back to the user, which will cause the playback video to affect the live watching. Therefore, when playing back the target video, prompt information may be displayed on a lens of the smart glasses first, where the prompt information is used to prompt that key point information exists in the scene video, that is, to prompt the spectator what highlights are happening at present. Then, when a play confirmation instruction is acquired, the playback of the target video is triggered by the play confirmation instruction. In addition, the above play confirmation instruction may be input by the spectator through hand, head or eye confirmation.

Figure 8:
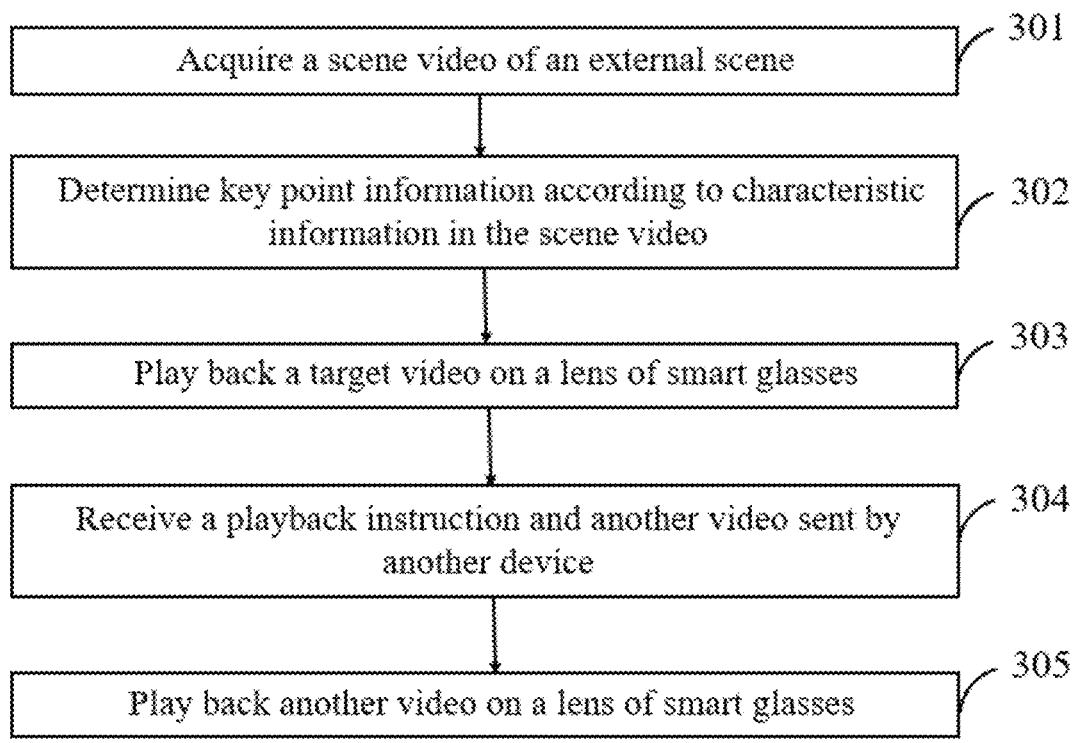
FIG. 8 shows a flowchart diagram of a video playback method according to still another illustrative embodiment.

FIG. 8 is a flowchart diagram showing a video playback method according to still another illustrative embodiment. As shown in FIG. 8, the video playback method provided by the present embodiment includes:

Step 301: acquire a scene video of an external scene.

In this step, a spectator can wear smart glasses while watching the game, so that the scene video of the current external scene, for example, a scene video of a sprint game or a scene video of a basketball game, is acquired through an image sensor on the smart glasses.

Step 302: determine key point information according to characteristic information in the scene video.

Specifically, scoring point information may be determined according to a relative positional relationship between a preset ball target and a preset equipment target in the scene video, and the key point information includes the scoring key point information. For example, if the sport currently watched by the spectator is a basketball game, the image characteristic included in the characteristic information may be a characteristic of a positional relationship between a basketball and a basket, so as to determine a scoring time by determining that the basketball is shot into the basket through image analysis technology and take the scoring time as the key point information.

Step 303: play back a target video on a lens of smart glasses;

The target video is extracted from the scene video, and then the target video can be played back on a lens of the smart glasses.

Step 304, receive a playback instruction and another video sent by another device.

In addition, in order to acquire more highlights information, the smart glasses worn by the current spectator may also receive a playback instruction, or a playback instruction and another video, sent by other devices.

Step 305: play back another video on a lens of smart glasses.

Figure 9:
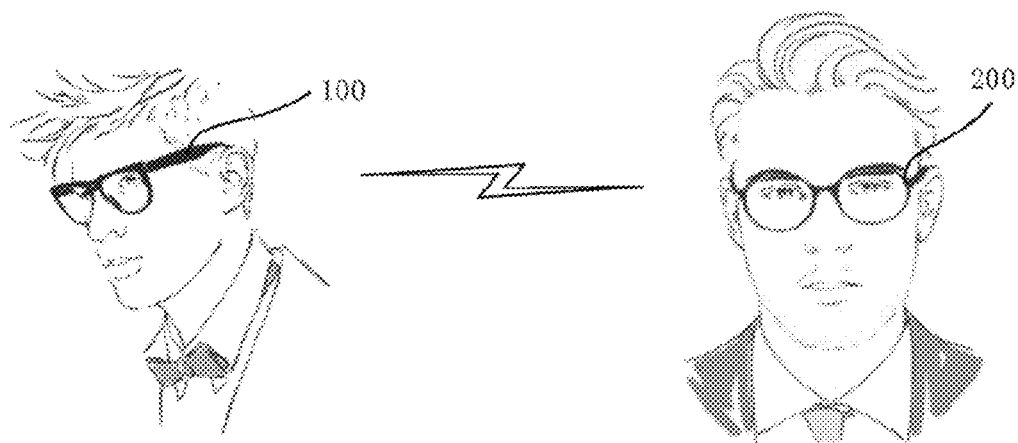
FIG. 9 is a scenario diagram of communication between different smart glasses.

FIG. 9 is a scenario diagram of communication between different smart glasses. As shown in FIG. 9, when multiple spectators are watching the same event, first smart glasses 100 worn by a first spectator receives a playback instruction which is sent by second smart glasses 200 worn by a second spectator, where the playback instruction may be used to prompt the first spectator to play back a corresponding target video in the first smart glasses 100. In addition, the playback instruction may also include a time point corresponding to the target video. Then, after receiving the playback instruction, the first smart glasses 100 may automatically play back the target video, thereby improving the spectator's watching experience.

However, because different spectators see the event from different angles, there is a case where highlights recorded in the second smart glasses 200 are not recorded in the first smart glasses 100. At this time, the first smart glasses 100 worn by the first spectator needs to receive the playback instruction and another video sent by the second smart glasses 200 worn by the second spectator. The target video recorded by the first smart glasses 100 is different from the another video recorded in the second smart glasses 200 at least in a shooting angle of the external scene, and at this time, the playback instruction is used to prompt the first spectator to play back another video on a lens of the first smart glasses 100, that is, to play back relevant highlights recorded in the second smart glasses 200. Thus, through a communication between the smart glasses worn by the spectator and other devices, information sharing is realized to further enrich the ways to acquire highlights, thereby improving the spectator's watching experience.

Figure 10:
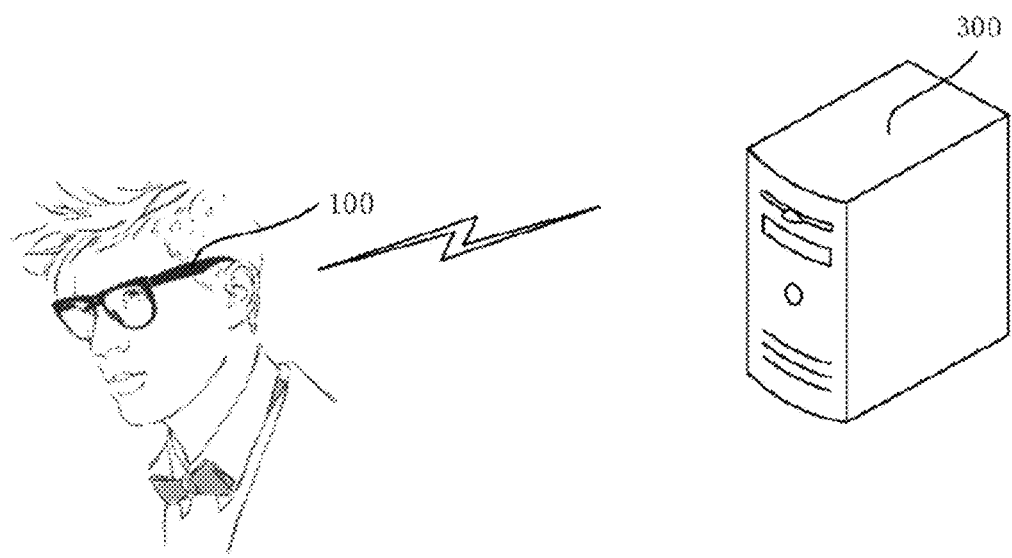
FIG. 10 is a scenario diagram of communication between smart glasses and a server.

FIG. 10 is a scenario diagram of communication between smart glasses and a server. As shown in FIG. 10, since pictures recorded by the spectator's first smart glasses 100 are usually not as comprehensive or clear as pictures of the official live broadcast of the event, in order to further improve the quality and comprehensiveness of the playback video provided to the spectator, the first spectator receives a playback instruction and another video sent by the server 300 through the first smart glasses 100, where the target video recorded by the first smart glasses 100 is different from the another video in the server 300 at least in the shooting angle of the external scene, and at this time, the playback instruction is used to prompt the first spectator to play back another video on a lens of the first smart glasses 100, that is, to play back relevant highlights in the server 300. Thus, through the communication between the smart glasses worn by the spectator and the event server, information sharing is realized to further enrich the ways to obtain highlights, thereby improving the spectator's watching experience.

In addition, on the basis of the above embodiment, when the spectator watches the playback of the target video through a lens of the smart glasses, a play progress of the target video may also be controlled by acquiring a trigger instruction acting on the smart glasses. For example, an operation gesture acting on a glasses leg of the smart glasses may be acquired to move forward or backward the video progress.

Figure 11:
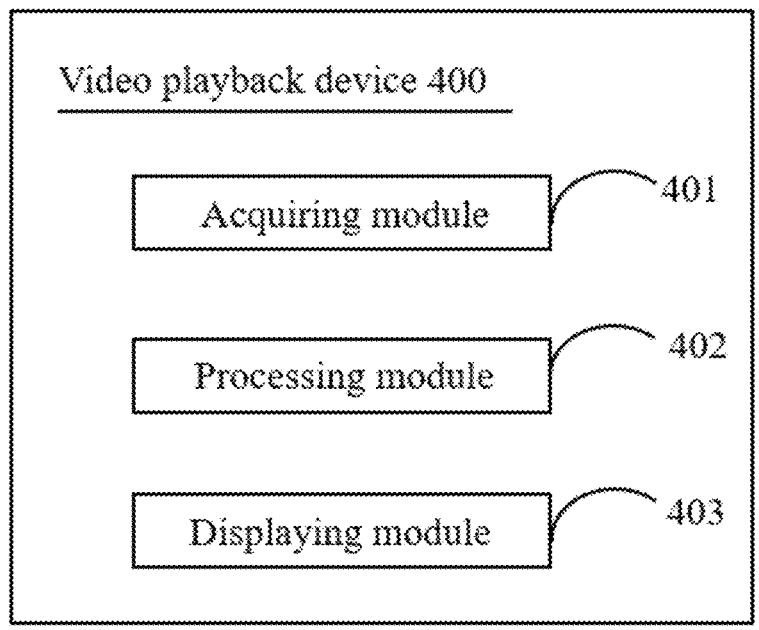
FIG. 11 shows a structural diagram of a video playback device according to an illustrative embodiment.

FIG. 11 shows a structural diagram of a video playback device according to an illustrative embodiment. As shown in FIG. 11, the video playback device 400 provided by the present embodiment includes:

an acquiring module 401, configured to acquire a scene video of an external scene;

a processing module 402, configured to extract a target video from the scene video when key point information exists in the scene video, where the target video is a video of a target time period corresponding to the key point information; and a displaying module 403, configured to play back the target video.

In a possible design, the processing module 402 is further configured to determine the key point information according to characteristic information in the scene video, where the characteristic information includes at least one of an image characteristic or a sound characteristic, and the characteristic information is information corresponding to a target behavior in a current sports event.

In a possible design, the processing module 402 is specifically configured to:

determine scoring point information according to a relative positional relationship between a preset ball target and a preset equipment target in the scene video, where the key point information includes the scoring point information; or determine starting or arriving point information according to a relative positional relationship between a preset character target and preset start line and end line targets in the scene video, where the key point information includes the starting or arriving point information;

or determine a starting point corresponding to a sound characteristic as the key point information when the sound characteristic in the scene video meets a preset sound condition.

In a possible design, the displaying module 403 is further configured to display prompt information on a lens of the smart glasses, and the prompt information is used to prompt that the key point information exists in the scene video; and the acquiring module 401 is further configured to acquire a play confirmation instruction, where the play confirmation instruction is used to trigger a star of the playing back of the target video.

Figure 12:
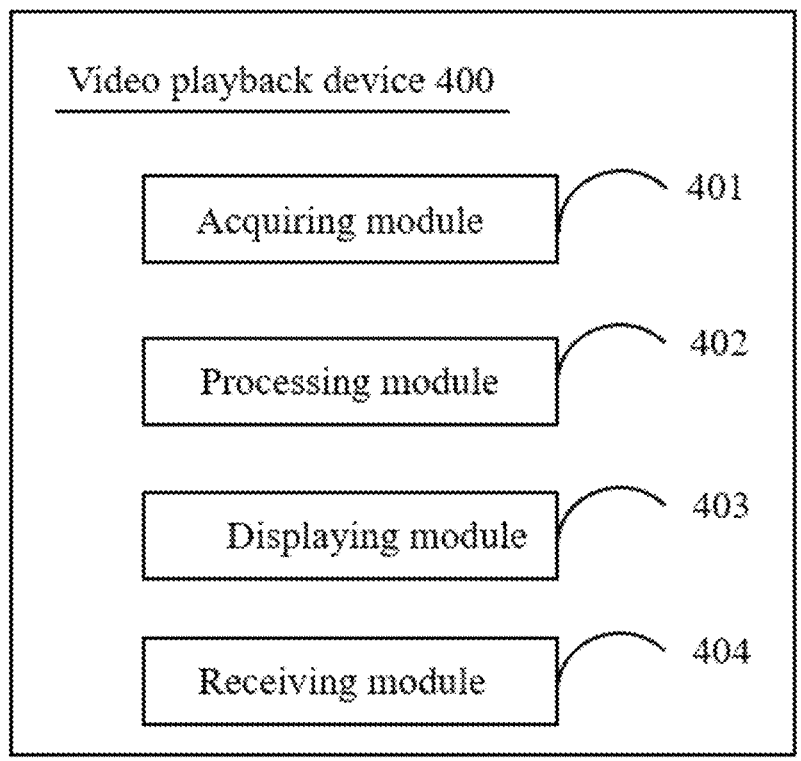
FIG. 12 shows a structural diagram of a video playback device according to another illustrative embodiment.

On the basis of the embodiment shown in FIG. 11, FIG. 12 shows a structural diagram of a video playback device according to another illustrative embodiment. As shown in FIG. 12, the video playback device 400 provided by the present embodiment further includes:

a receiving module 404, configured to receive a playback instruction sent by another device, where the playback instruction is used to prompt to play back the target video; or configured to receive a playback instruction and another video sent by another device, where the target video is different from the another video at least in a shooting angle of the external scene, and the playback instruction is used to prompt to play back the another video.

In a possible design, the displaying module 403 is specifically configured to:

determine a key point type corresponding to the key point information according to characteristic information in the scene video;

determine a playback speed of the target video according to the key point type and a preset playing rule; and play back the target video on a lens of the smart glasses according to the playback speed.

In a possible design, the acquiring module 401 is further configured to acquire a trigger instruction acting on the smart glasses; and the processing module 402 is further configured to control a play progress of the target video according to the trigger instruction.

Figure 13:
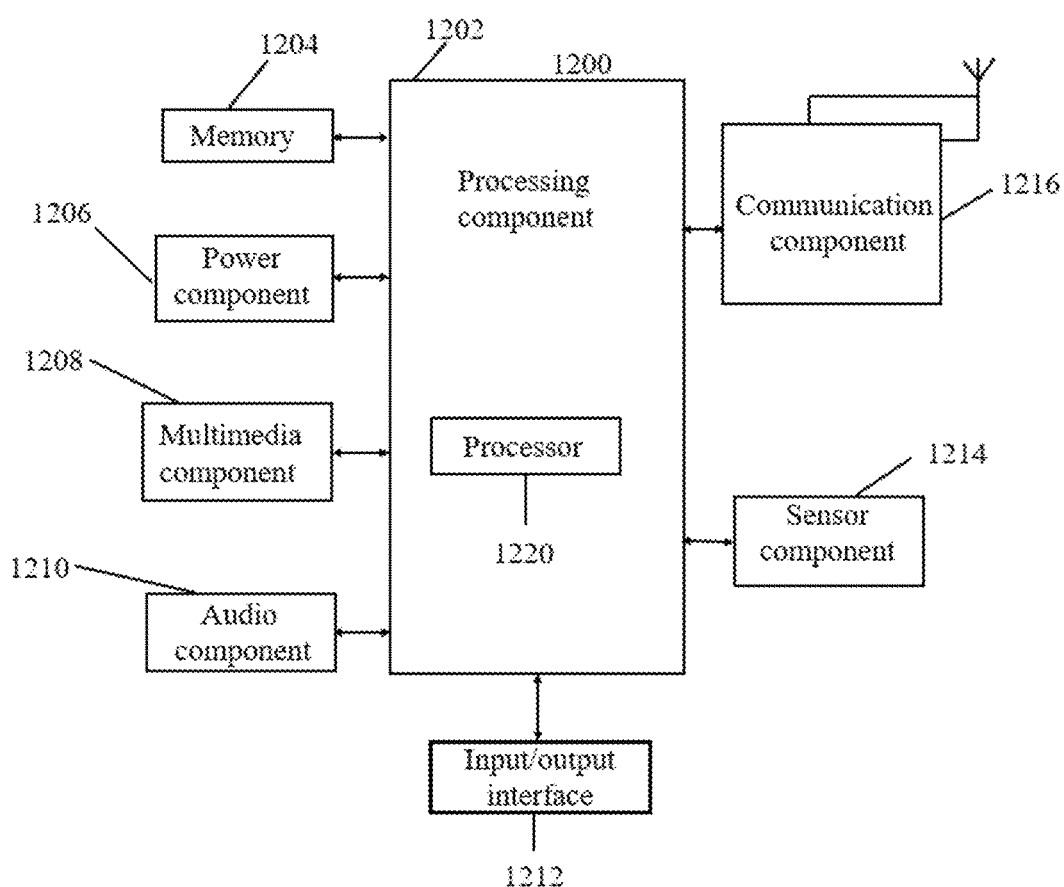
FIG. 13 shows a block diagram of smart glasses according to an illustrative embodiment.

FIG. 13 shows a block diagram of smart glasses according to an illustrative embodiment. Referring to FIG. 13, the smart glasses 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls the overall operation of the smart glasses 1200, such as operations associated with display, data communication, multimedia operations, and recording operations. The processing component 1202 may include one or more processors 1220 to execute instructions to complete all or part of the steps of the above method. In addition, the processing component 1202 may include one or more modules to facilitate interaction between the processing component 1202 and other components. For example, the processing component 1202 may include a multimedia module to facilitate interaction between the multimedia component 1208 and the processing component 1202.

The memory 1204 is configured to store various types of data to support operations of the smart glasses 1200. Examples of these data include instructions for any application or method operating on the smart glasses 1200, various types of data, messages, pictures, videos, etc. The memory 1204 may be implemented by any type of volatile or non-volatile storage device or a combination thereof, such as a static random-access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power component 1206 provides power to various components of the smart glasses 1200. The power component 1206 may include a power management system, one or more power supplies, and other components associated with generating, managing, and distributing power for the smart glasses 1200.

The multimedia component 1208 includes a lens with a display function provided for the smart glasses 1200.

The audio component 1210 is configured to output and/or input audio signals. For example, the audio component 1210 includes a microphone (MIC), and the microphone is configured to receive an external audio signal when the smart glasses 1200 is in an operation mode, such as a call mode, a recording mode, and a speech recognition mode. The received audio signal may be further stored in the memory 1204 or transmitted via the communication component 1216. In some embodiments, the audio component 1210 further includes a speaker configured to output an audio signal.

The I/O interface 1212 provides an interface between the processing component 1202 and a peripheral interface module. The peripheral interface module 12 may be a keyboard, a click wheel, a button, etc.

The sensor component 1214 includes one or more sensors configured to provide various aspects of condition evaluation for the smart glasses 1200. For example, the sensor component 1214 may include an image sensor, where the image sensor is configured to acquire an environmental image or video of the external environment of the smart glasses 1200. In addition, the sensor component 1214 may also detect an on/off state of the smart glasses 1200 and a relative positioning of a component, such as a lens of smart glasses 1200. The sensor component 1214 may also detect a position change of the smart glasses 1200 or a component of the smart glasses 1200, presence or absence of user contact with the smart glasses 1200, an orientation or acceleration/deceleration of the smart glasses 1200, and a temperature change of the smart glasses 1200. The sensor component 1214 may include a proximity sensor configured to detect the presence of a nearby object without any physical contact. The sensor component 1214 may also include an optical sensor, such as a CMOS or a CCD image sensor, for use in an imaging application. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the smart glasses 1200 and other devices. The smart glasses 1200 may access a wireless network based on a communication standard, such as WiFi, 2G or 3G, or a combination thereof. In an illustrative embodiment, the communication component 1216 receives a broadcast signal or broadcast related information from an external broadcast management system via a broadcast channel. In an illustrative embodiment, the communication component 1216 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an illustrative embodiment, the smart glasses 1200 may be implemented by one or more of an application specific integrated circuit (ASIC), a digital signal processor (DSPS), a digital signal processing device (DSPD), a programmable logic device (PLD), a field programmable gate array (FPGA), a controller, a microcontroller, a microprocessor, or other electronic components, and configured to perform an information prompting method, including:

acquiring a scene video of an external scene, where the scene video includes a behavior characteristic of a target object;

matching prompt information corresponding to the target object according to the behavior characteristic, where the prompt information is information associated with the behavior characteristic; and displaying the prompt information on a lens of smart glasses.

In an illustrative embodiment, a non-transitory computer-readable storage medium including an instruction is further provided, for example, a memory 1204 including an instruction, the above instruction can be executed by a processor 1220 of the smart glasses 1200 to complete the above method. For example, the non-transitory computer-readable storage medium may be a ROM, a random-access memory (RAM), a CD-ROM, a magnetic tape, a floppy disk, an optical data storage device, etc.

The present embodiment further provides a program product, the program product includes a computer program, the computer program is stored in a readable storage medium. At least one processor of an electronic device can read the computer program from the readable storage medium, and the at least one processor executes the computer program to cause the electronic device to implement the steps of the above method.

Those skilled in the art can understand that all or part of the steps to realize the above method embodiments may be completed by a program instructing related hardware. The afore-mentioned program may be stored in a computer-readable storage medium. When the program is executed, the steps including the above method embodiments are executed. The afore-mentioned storage media include various media that can store program code, such as a ROM, a RAM, a magnetic disc, or an optical disc.

Finally, it should be noted that the above embodiments are only used to illustrate the technical solutions of the present application, but not to limit it; although the present application has been described in detail with reference to the above embodiments, those skilled in the art should understand that they can still modify the technical solutions recorded in the above embodiments or make equivalent replacement for some or all of the technical features; however, these modifications or replacements do not make the essence of the corresponding technical solutions deviate from the scope of the technical solutions of the embodiments of the present application.

What is claimed is:

1. A video playback method, wherein the method is applied to smart glasses, and the method comprises:
    acquiring a scene video of an external scene;
    extracting a target video from the scene video when key point information exists in the scene video, wherein the target video of a preset time length is acquired with a corresponding occurrence time of the key point information being taken as a reference point; and
    playing back the target video on a lens of the smart glasses;
    after the acquiring the scene video of the external scene, further comprising:
    determining the key point information according to characteristic information in the scene video, wherein the characteristic information comprises at least one of an image characteristic or a sound characteristic, and the characteristic information is information corresponding to a target behavior in a current sports event;
    wherein the playing back the target video on a lens of the smart glasses, comprises:
    determining a key point type corresponding to the key point information according to characteristic information in the scene video;
    determining a playback speed of the target video according to the key point type and a preset playing rule; and
    playing back the target video on the lens of the smart glasses according to the playback speed.

2. The video playback method according to claim 1, wherein the determining the key point information according to characteristic information in the scene video, comprises:
    determining scoring point information according to a relative positional relationship between a preset ball target and a preset equipment target in the scene video, wherein the key point information comprises the scoring point information; or
    determining starting or arriving point information according to a relative positional relationship between a preset character target and preset start line and end line targets in the scene video, wherein the key point information comprise the starting or arriving point information; or
    determining a starting point corresponding to a sound characteristic as the key point information when the sound characteristic in the scene video meets a preset sound condition.

3. The video playback method according to claim 1, before the playing back the target video on a lens of the smart glasses, further comprising:
    displaying prompt information on a lens of the smart glasses, wherein the prompt information is used to prompt that the key point information exists in the scene video; and
    acquiring a play confirmation instruction, wherein the play confirmation instruction is used to trigger a start of the playing back of the target video.

4. The video playback method according to claim 1, further comprising:
    receiving a playback instruction sent by another device, wherein the playback instruction is used to prompt to play back the target video; or
    receiving a playback instruction and another video sent by another device, wherein the target video is different from the another video at least in a shooting angle of the external scene, and the playback instruction is used to prompt to play back the another video.

5. The video playback method according to claim 1, after the playing back the target video on a lens of the smart glasses, further comprising:
acquiring a trigger instruction acting on the smart glasses; and
controlling a play progress of the target video according to the trigger instruction.

6. Smart glasses, comprising a processor, a memory, a lens and an image sensor, wherein the processor is respectively connected with the memory, the lens and the image sensor;
the image sensor is configured to acquire a scene video of an external scene;
the memory is configured to store a computer program of the processor;
wherein the processor, when executing the computer program, is configured to:
acquire a scene video of an external scene;
extract a target video from the scene video when key point information exists in the scene video, wherein the target video is of a preset time length is acquired with a corresponding occurrence time of the key point information being taken as a reference point; and
play back the target video on a lens of the smart glasses;
wherein the processor is further configured to determine the key point information according to characteristic information in the scene video after the scene video of the external scene is acquired,
wherein the characteristic information comprises at least one of an image characteristic or a sound characteristic, and the characteristic information is information corresponding to a target behavior in a current sports event;
wherein the processor is further configured to:
determine a key point type corresponding to the key point information according to characteristic information in the scene video;
determine a playback speed of the target video according to the key point type and a preset playing rule; and
play back the target video on the lens of the smart glasses according to the playback speed; and
the lens is configured to display the target video.

7. The smart glasses according to claim 6, wherein the processor is further configured to:
determine scoring point information according to a relative positional relationship between a preset ball target and a preset equipment target in the scene video, wherein the key point information comprises the scoring point information; or
determine starting or arriving point information according to a relative positional relationship between a preset character target and preset start line and end line targets in the scene video, wherein the key point information comprise the starting or arriving point information; or
determine a starting point corresponding to a sound characteristic as the key point information when the sound characteristic in the scene video meets a preset sound condition.

8. The smart glasses according to claim 6, wherein the processor is further configured to display prompt information on a lens of the smart glasses and acquire a play confirmation instruction before the target video on a lens of the smart glasses is played back,
wherein the prompt information is used to prompt that the key point information exists in the scene video and the play confirmation instruction is used to trigger a start of the playing back of the target video.

9. The smart glasses according to claim 6, wherein the processor is further configured to receive a playback instruction sent by another device or receive a playback instruction and another video sent by another device,
wherein the playback instruction is used to prompt to play back the target video, the target video is different from the another video at least in a shooting angle of the external scene, and the playback instruction is used to prompt to play back the another video.

10. The smart glasses according to claim 6, wherein the processor is further configured to acquire a trigger instruction acting on the smart glasses and control a play progress of the target video according to the trigger instruction after the target video on the lens of the smart glasses is played back.

11. A non-transitory computer-readable storage medium, on which a computer program is stored, wherein the computer program, when executed by a processor, causes the processor to:
acquire a scene video of an external scene;
extract a target video from the scene video when key point information exists in the scene video, wherein the target video is of a preset time length is acquired with a corresponding occurrence time of the key point information being taken as a reference point; and
play back the target video on a lens of the smart glasses;
wherein the computer program further causes the processor to determine the key point information according to characteristic information in the scene video after the scene video of the external scene is acquired,
wherein the characteristic information comprises at least one of an image characteristic or a sound characteristic, and the characteristic information is information corresponding to a target behavior in a current sports event;
wherein the computer program further causes the processor to:
determine a key point type corresponding to the key point information according to characteristic information in the scene video;
determine a playback speed of the target video according to the key point type and a preset playing rule; and
play back the target video on the lens of the smart glasses according to the playback speed.

12. The non-transitory computer-readable storage medium according to claim 11, wherein the computer program further causes the processor to:
determine scoring point information according to a relative positional relationship between a preset ball target and a preset equipment target in the scene video, wherein the key point information comprises the scoring point information; or
determine starting or arriving point information according to a relative positional relationship between a preset character target and preset start line and end line targets in the scene video, wherein the key point information comprise the starting or arriving point information; or
determine a starting point corresponding to a sound characteristic as the key point information when the sound characteristic in the scene video meets a preset sound condition.

13. The non-transitory computer-readable storage medium according to claim 11, wherein the computer program further causes the processor to display prompt information on a lens of the smart glasses and acquire a play confirmation instruction before the target video on a lens of the smart glasses is played back,
- wherein the prompt information is used to prompt that the key point information exists in the scene video and the play confirmation instruction is used to trigger a start of the playing back of the target video.

14. The non-transitory computer-readable storage medium according to claim 11, wherein the computer program further causes the processor to receive a playback instruction sent by another device or receive a playback instruction and another video sent by another device,
- wherein the playback instruction is used to prompt to play back the target video, the target video is different from the another video at least in a shooting angle of the external scene, and the playback instruction is used to prompt to play back the another video.

\* \* \* \* \*